(12) United States Patent
Kuwano et al.

(10) Patent No.: US 10,908,659 B2
(45) Date of Patent: Feb. 2, 2021

(54) MEMORY SYSTEM AND METHOD OF CONTROLLING NONVOLATILE MEMORY

(71) Applicant: TOSHIBA MEMORY CORPORATION, Tokyo (JP)

(72) Inventors: Yuka Kuwano, Yokohama Kanagawa (JP); Takehiko Amaki, Yokohama Kanagawa (JP); Toshikatsu Hida, Yokohama Kanagawa (JP); Shohei Asami, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 53 days.

(21) Appl. No.: 16/010,680

(22) Filed: Jun. 18, 2018

(65) Prior Publication Data
US 2019/0094927 A1 Mar. 28, 2019

(30) Foreign Application Priority Data

Sep. 22, 2017 (JP) .................... 2017-182026

(51) Int. Cl.
| | |
|---|---|
| G06F 1/20 | (2006.01) |
| G06F 12/02 | (2006.01) |
| G06F 1/16 | (2006.01) |
| G06F 3/06 | (2006.01) |
| G05B 15/02 | (2006.01) |

(52) U.S. Cl.
CPC .............. *G06F 1/206* (2013.01); *G05B 15/02* (2013.01); *G06F 1/1684* (2013.01); *G06F 3/0619* (2013.01); *G06F 3/0653* (2013.01); *G06F 3/0679* (2013.01); *G06F 12/02* (2013.01)

(58) Field of Classification Search
CPC ........... H01J 37/32944; H01J 37/32064; H01J 37/3299
See application file for complete search history.

(56) References Cited

U.S. PATENT DOCUMENTS

| | | | |
|---|---|---|---|
| 8,472,274 B2 | 6/2013 | Fai et al. | |
| 8,614,919 B2 | 12/2013 | Lee et al. | |
| 9,330,790 B2 | 5/2016 | Kim et al. | |
| 2009/0168487 A1* | 7/2009 | Rodriguez | G11C 11/22 365/145 |
| 2013/0067138 A1* | 3/2013 | Schuette | G06F 3/0679 711/103 |
| 2013/0227268 A1* | 8/2013 | Ichida | G06F 9/448 713/100 |
| 2014/0059406 A1* | 2/2014 | Hyun | G11C 11/5621 714/773 |
| 2014/0208004 A1* | 7/2014 | Cohen | G06F 12/0246 711/103 |
| 2015/0301932 A1* | 10/2015 | Oh | G06F 11/00 711/102 |

(Continued)

FOREIGN PATENT DOCUMENTS

JP 2014-509769 A 4/2014

*Primary Examiner* — Thomas C Lee
*Assistant Examiner* — Anzuman Sharmin
(74) *Attorney, Agent, or Firm* — Kim & Stewart LLP

(57) ABSTRACT

A memory system includes a nonvolatile memory and a memory controller. The memory controller is configured to execute a process to adjust a temperature of the nonvolatile memory upon determining that the temperature is outside a preferred range.

15 Claims, 9 Drawing Sheets

(56) References Cited

U.S. PATENT DOCUMENTS

| | | | |
|---|---|---|---|
| 2015/0373876 A1* | 12/2015 | Berke | G05B 15/02 |
| | | | 700/282 |
| 2016/0239235 A1 | 8/2016 | Chung et al. | |
| 2016/0260481 A1* | 9/2016 | Miura | G11C 13/0033 |
| 2016/0334992 A1 | 11/2016 | Yashiro | |
| 2017/0090784 A1* | 3/2017 | Reusswig | G06F 3/0616 |
| 2017/0322749 A1* | 11/2017 | Qawami | G06F 3/061 |
| 2018/0067678 A1* | 3/2018 | Jeong | G06F 3/064 |
| 2018/0101317 A1* | 4/2018 | Lin | G11C 16/3459 |
| 2019/0057038 A1* | 2/2019 | Haswell | G06F 12/0246 |

* cited by examiner

MEMORY SYSTEM AND METHOD OF CONTROLLING NONVOLATILE MEMORY

CROSS-REFERENCE TO RELATED APPLICATION

This application is based upon and claims the benefit of priority from Japanese Patent Application No. 2017-182026, filed Sep. 22, 2017, the entire contents of which are incorporated herein by reference.

FIELD

Embodiments described herein relate generally to a memory system and a method of controlling a nonvolatile memory.

BACKGROUND

In the related art, nonvolatile memory such as NAND flash memory has characteristics, such as reliability, that depend on operating temperature.

For example, when cells of the nonvolatile memory are in high-temperature, data retention characteristics of the cells deteriorate as compared to cells that are at room temperature. When cells of the nonvolatile memory are in low-temperature, the cells are tend to be more easily affected by read disturb and program disturb than cells that are at the room temperature.

In this way, at high temperature and low temperature, threshold voltage distributions of cells of nonvolatile memory are shifted more easily, in other words, reading of data becomes more difficult, than at room temperature.

DETAILED DESCRIPTION

Embodiments provide a memory system capable of improving ease of reading data and a method of controlling a nonvolatile memory.

In general, according to one embodiment, a memory system includes a nonvolatile memory and a memory controller. The memory controller is configured to execute a process to adjust the temperature of the nonvolatile memory upon determining that the temperature is outside a preferred range.

Hereinafter, a memory system and a method of controlling a nonvolatile memory according to embodiments will be described in detail with reference to the drawings. The scope of the present disclosure is not limited to the embodiments disclosed herein.

First Embodiment

A memory system 1, for example, a solid-state drive (SSD), is capable of being connected to communicate with a host apparatus HA, and may function as an external storage device for the host apparatus HA. The host apparatus HA may be, for example, an information processing apparatus such as a personal computer, a server, a storage box, a mobile phone, an imaging apparatus, a portable terminal such as a tablet computer or a smartphone, a game apparatus, or an in-vehicle terminal such as a car navigation system.

Figure 1:
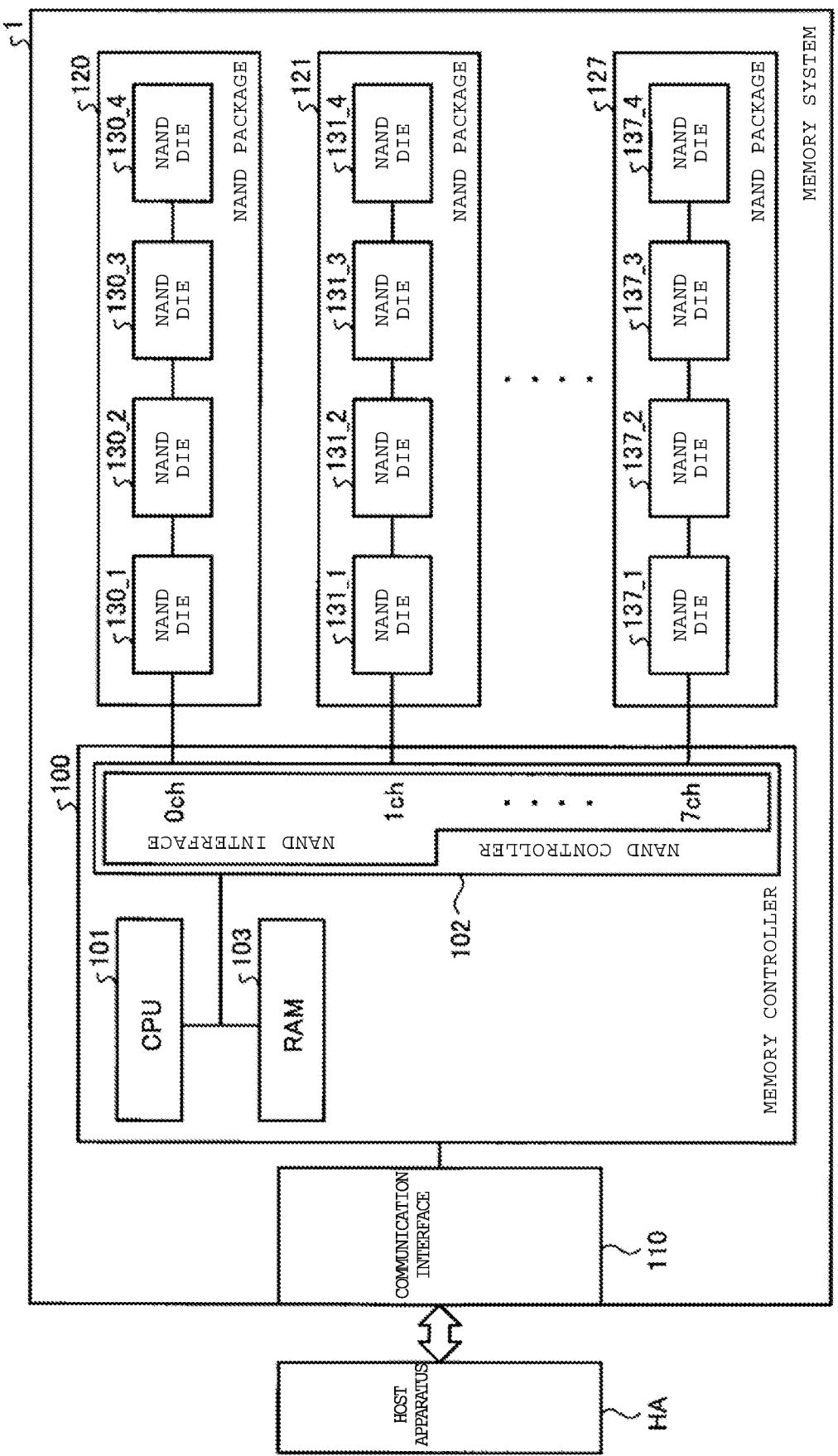
FIG. 1 is a diagram illustrating a configuration of a memory system according to a first embodiment.

FIG. 1 is a diagram illustrating a configuration of the memory system 1 according to the first embodiment. As illustrated in FIG. 1, the memory system 1 includes a memory controller 100, a communication interface 110, and eight NAND packages 120, 121, . . . , and 127. In the embodiment, an example in which the eight NAND packages are provided will be described, but the number of NAND packages is not limited. The number of NAND packages may be one or more.

The communication interface 110 controls communication with the host apparatus HA under the control of the CPU 101. The communication interface 110 receives a command (e.g., a read command or a write command) or write data from the host apparatus HA. The communication interface 110 transmits data read in response to a read command to the host apparatus HA.

The NAND packages 120, 121, . . . , and 127 include one or more (in the embodiment, four) NAND dies 130_1 to 130_4, 131_1 to 131_4, . . . , and 137_1 to 137_4 (hereinafter also referred to as NAND dies 130, 131, . . . , and 137), respectively. In the embodiment, an example in which four NAND dies are provided in the NAND package will be described. The embodiment is not limited to four NAND dies, but one or more NAND dies may be provided.

In the embodiment, an example in which a NAND flash memory (hereinafter also referred to as a NAND memory) including the NAND packages 120, 121, . . . , and 127 is used will be described, but any kind of nonvolatile memory may be used instead of the NAND memory. For example, instead of the NAND memory, a NOR flash memory or a flash memory including memory cells with a 3-dimensional structure may be applied.

The memory controller 100 is implemented as, for example, a system on chip (SoC) package. The memory controller 100 manages each component of the memory system 1 to execute data transmission between the host apparatus HA and the NAND packages 120, 121, . . ., and 127.

The memory controller 100 includes a CPU 101, a NAND controller 102, a RAM 103, and a NAND interface 104 including multiple channels (e.g., 0ch, 1ch, . . . , and 7ch). The CPU 101, the NAND controller 102, and the RAM 103 are connected to each other via a bus.

The RAM 103 is used as a storage region that temporarily stores various kinds of data. As the RAM 103, a dynamic random access memory (DRAM) or a static random access memory (SRAM) may be used.

The NAND controller 102 executes access control on the NAND packages 120, 121, . . ., and 127 under the control of the CPU 101. The access control may include write control, read control, and erase control. The NAND controller 102 includes the NAND interface 104 that controls the access to each group of the NAND dies (130_1 to 130_4, 131_1 to 131_4, . . ., and 137_1 to 137_4) belonging to the same channel. Thus, simultaneous (i.e., parallel) access to each channel is realized.

The CPU 101 operates based on a firmware program. For example, the firmware program is stored in advance in the NAND memory when the memory system 1 is manufactured and shipped. The CPU 101 loads the firmware program from the NAND memory to the RAM 103 at the time of start-up (e.g., power-on). The CPU 101 functions as various functional units by executing the firmware program loaded into the RAM 103.

Figure 2:
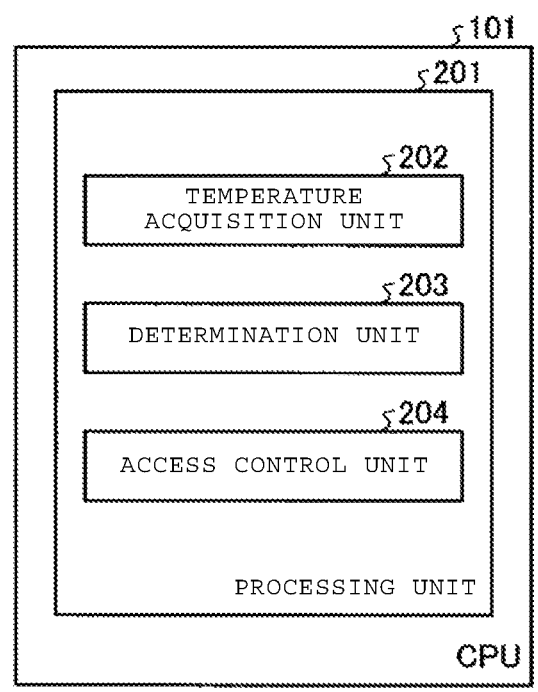
FIG. 2 is a block diagram illustrating a function realized by a CPU according to the first embodiment.

FIG. 2 is a block diagram illustrating a function realized by executing the firmware by the CPU 101 according to the first embodiment. The CPU 101 functions as a processing unit 201 that controls the memory controller 100. The processing unit 201 includes a temperature acquisition unit 202, a determination unit 203, and an access control unit 204.

Some or all of the functions of the processing unit 201 may be realized by a dedicated hardware circuit rather than the CPU 101 that executes the firmware. For example, the memory controller 100 may include a field-programmable gate array (FPGA) or an application specific integrated circuit (ASIC) and some or all of the functions of the processing unit 201 may be realized by the FPGA or the ASIC.

The temperature acquisition unit 202 acquires temperature information indicating temperature inside the NAND dies 130, 131, . . ., and 137 from the NAND dies 130, 131, . . ., and 137 via the NAND controller 102.

The NAND dies 130, 131, . . ., and 137 according to the embodiment each includes a sensor for measuring temperature. Thus, an example in which the temperature acquisition unit 202 acquires temperature information obtained by the NAND dies 130, 131, . . ., and 137 will be described. In the embodiment, a temperature acquisition method is not limited to a method of acquiring temperature information obtained by the NAND dies 130, 131, . . ., and 137, but temperature information may be acquired from a temperature sensor installed in the memory system 1.

The determination unit 203 determines whether temperature indicated by the temperature information acquired by the temperature acquisition unit 202 is lower than a low-temperature threshold TL. The low-temperature threshold TL is a threshold for determining whether temperature is low. The low-temperature threshold TL is defined according to an embodiment such as the specification or the like of the NAND packages 120, 121, . . ., and 127.

The access control unit 204 executes access control on the NAND packages 120, 121, . . ., and 127 in accordance with the determination result by the determination unit 203. In the embodiment, when the determination unit 203 determines that the temperature indicated by the temperature information acquired by the temperature acquisition unit 202 is lower than the low-temperature threshold TL, the access control unit 204 activates the NAND dies 130, 131, . . ., and 137 provided in the NAND packages 120, 121, . . ., and 127.

In the embodiment, as the activation on the NAND dies 130, 131, . . ., and 137, a padding process is executed on the NAND dies 130, 131, . . ., and 137. The padding process is a process of writing any data (for example, zero) in a region of the NAND dies 130, 131, . . ., and 137, in which data is not written. For example, the padding process is executed before data is written on the NAND dies 130, 131, . . ., and 137 in response to a request from the host apparatus HA. In addition, the padding process may be executed before data is read from the NAND dies 130, 131, . . ., and 137. In the embodiment, by executing the padding process to heat the NAND dies 130, 131, . . ., and 137, it is possible to raise the temperature of the NAND dies 130, 131, . . ., and 137 up to the room temperature (i.e., equal to or greater than the low-temperature threshold TL).

Figure 3:
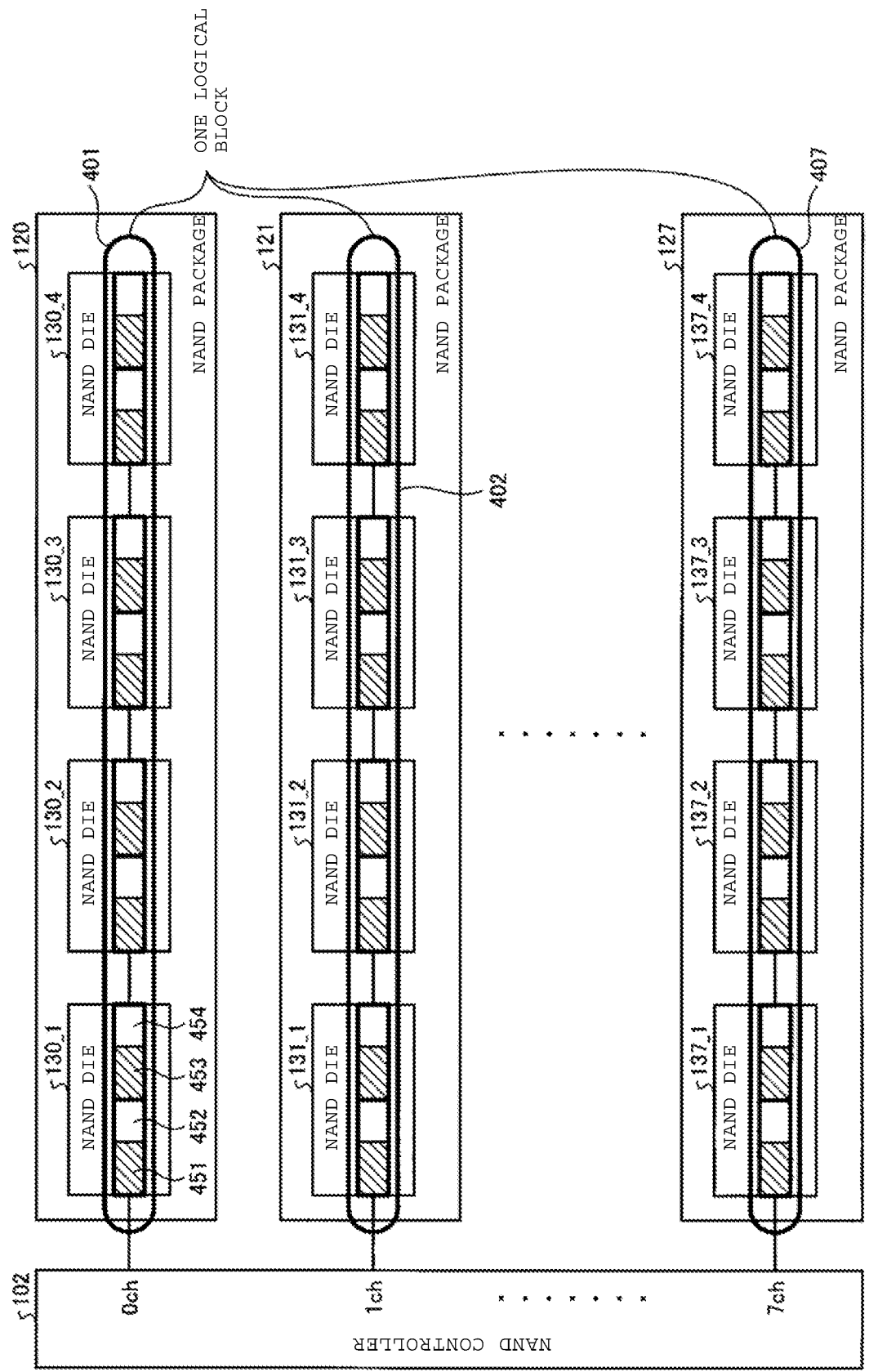
FIG. 3 is a diagram illustrating a configuration of one logical block in NAND packages according to the first embodiment.

Next, the padding process executed by the access control unit 204 according to the embodiment will be described. FIG. 3 is a diagram illustrating a configuration of one logical block in the NAND packages 120, 121, . . ., and 127 according to the embodiment. In FIG. 3, for example, in the NAND die 130_1, a first physical block is configured with a data-written region 451 and a data-unwritten region 452 and a second physical block is configured with a data-written region 453 and data-unwritten region 454. In regions 401, 402, . . ., and 407, similarly, two physical blocks of each of the NAND dies 130, . . ., and 137 are shown. In the embodiment, two physical blocks of each of the NAND dies 130_1 to 130_4, two physical blocks of each of the NAND dies 131_1 to 131_4, . . ., and two physical blocks of each of the NAND dies 137_1 to 137_4 collectively form one logical block.

As illustrated in FIG. 3, one logical block includes two physical blocks of each of the NAND dies 130_1 to 130_4, the NAND dies 131_1 to 131_4, . . ., and the NAND dies 137_1 to 137_4 of each of the NAND packages 120, 121, . . ., and 127.

In the following example, the padding process executed by writing any data (for example, zero) in one physical blocks in which data is written halfway will be described. Embodiments are not limited to such a method. The padding process may be executed by writing any data to unwritten (i.e., erased) region in physical blocks.

In an example illustrated in FIG. 3, the logical block including the physical blocks in which data is written halfway among the logical blocks is illustrated. For example, in the two blocks of the NAND die 130_1, the written region 451 and the unwritten region 452 are in the first block, and the written region 453 and the unwritten region 454 are in the second block. The same applies to the other NAND dies 130_2 to 130_4, NAND dies 131_1 to 131_4, . . ., and NAND dies 137_1 to 137_4. The access control unit 204 according to the embodiment executes the padding process on the unwritten regions 452 and 454.

Figure 4:
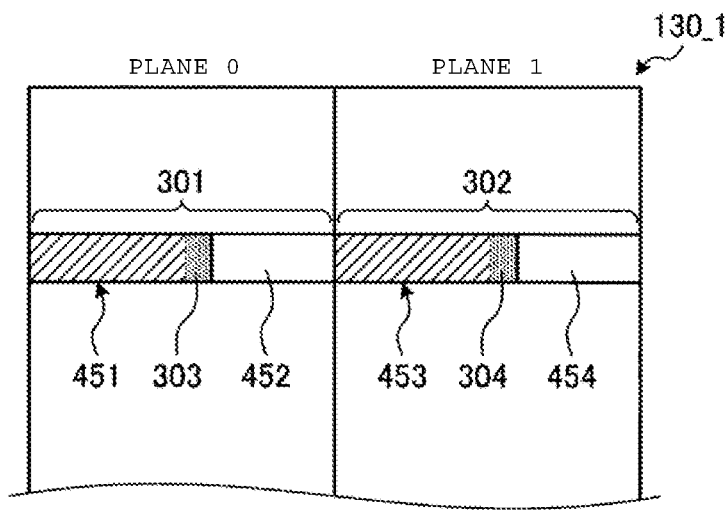
FIG. 4 is a diagram illustrating a configuration of a NAND die according to the first embodiment.

FIG. 4 is a diagram illustrating a configuration of the NAND die 130_1 according to the first embodiment. As illustrated in FIG. 4, the NAND die 130_1 is configured with plane 0 and plane 1. In the NAND die 130_1 according to the embodiment, a block 301 in plane 0 and a block 302 in plane 1 constitute a part of logical block 1 described above. As described above, the written region 451 and the unwritten region 452 are in the block 301 and the written region 453 and the unwritten region 454 are in the block 302.

Among the written regions 451 and 453, the regions 303 and 304, which are adjacent to the unwritten regions 452 and 454 respectively, might have a problem that a read error occurs more easily than other regions, that is, reading of data becomes more difficult. Accordingly, in the embodiment, the padding process is preferentially executed on a logical block that includes physical blocks in which data is written halfway among the logical blocks.

Figure 5:
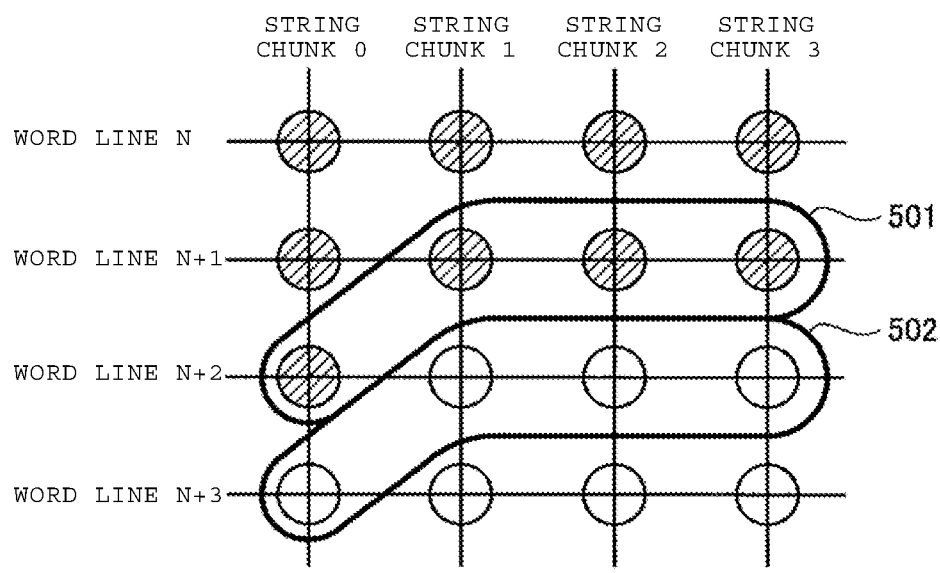
FIG. 5 is a diagram illustrating a detailed configuration of written regions and unwritten regions in a plane of the NAND die according to the first embodiment.

FIG. 5 is a diagram illustrating a detailed configuration of written regions and unwritten regions in a plane of the NAND die according to the first embodiment. In an example illustrated in FIG. 5, a region indicated by a circle represents a string (which includes three pages for example) in which reading and writing can be executed. In the embodiment, a group formed by three pages in which writing can be executed simultaneously is referred to as a string. In the embodiment, the string configured with three pages is given as an example, but the number of pages that constitutes the string can be any number.

As illustrated in FIG. 5, a block of the NAND die is configured with strings, the number of which is obtained by multiplying four (i.e., the number of string chunks) by 64 (i.e., the number of word lines). The string chunk indicates a set of strings in a direction that is orthogonal to the word lines. In the embodiment, four string chunks and 64 word lines are used as an example. The numbers of string chunks and word lines in the block of the NAND die can be any number.

A string indicated by diagonal lines represents that data is already written. A string indicated by white represents that data is not yet written. Among the strings in which data is already written, in a string group 501 that is adjacent to the strings in which data is not yet written, there might be a high possibility of a read error occurring, that is, a high possibility of the reading of data becoming more difficult. Accordingly, the access control unit 204 according to the embodiment executes the padding process starting from a string group 502 in which data is not written and which is adjacent to the string group 501 in which data is written.

In this way, the access control unit 204 according to the embodiment executes the padding process, among the physical blocks of the NAND die in which data is written halfway, starting from the string in which data is not yet written and which is adjacent to the string in which data is written. In the embodiment, the padding process executed for each string is given as an example, but embodiments are not limited to each string. The padding process may be executed for any region in which data is to be written.

Thus, it is possible to reduce an error rate when data is read from the NAND die and it is possible to allow the temperature of the NAND die to be close to the room temperature by activating the NAND die.

After the padding process ends on the logical block including the physical blocks in which data has been written halfway, the access control unit 204 executes the padding process on another logical block if the temperature indicated by the temperature information is still lower than the low-temperature threshold TL. When the temperature indicated by the temperature information is lower than the low-temperature threshold TL, heating is executed through the padding process. Thus, the NAND die can be heated toward the room temperature.

Figure 6:
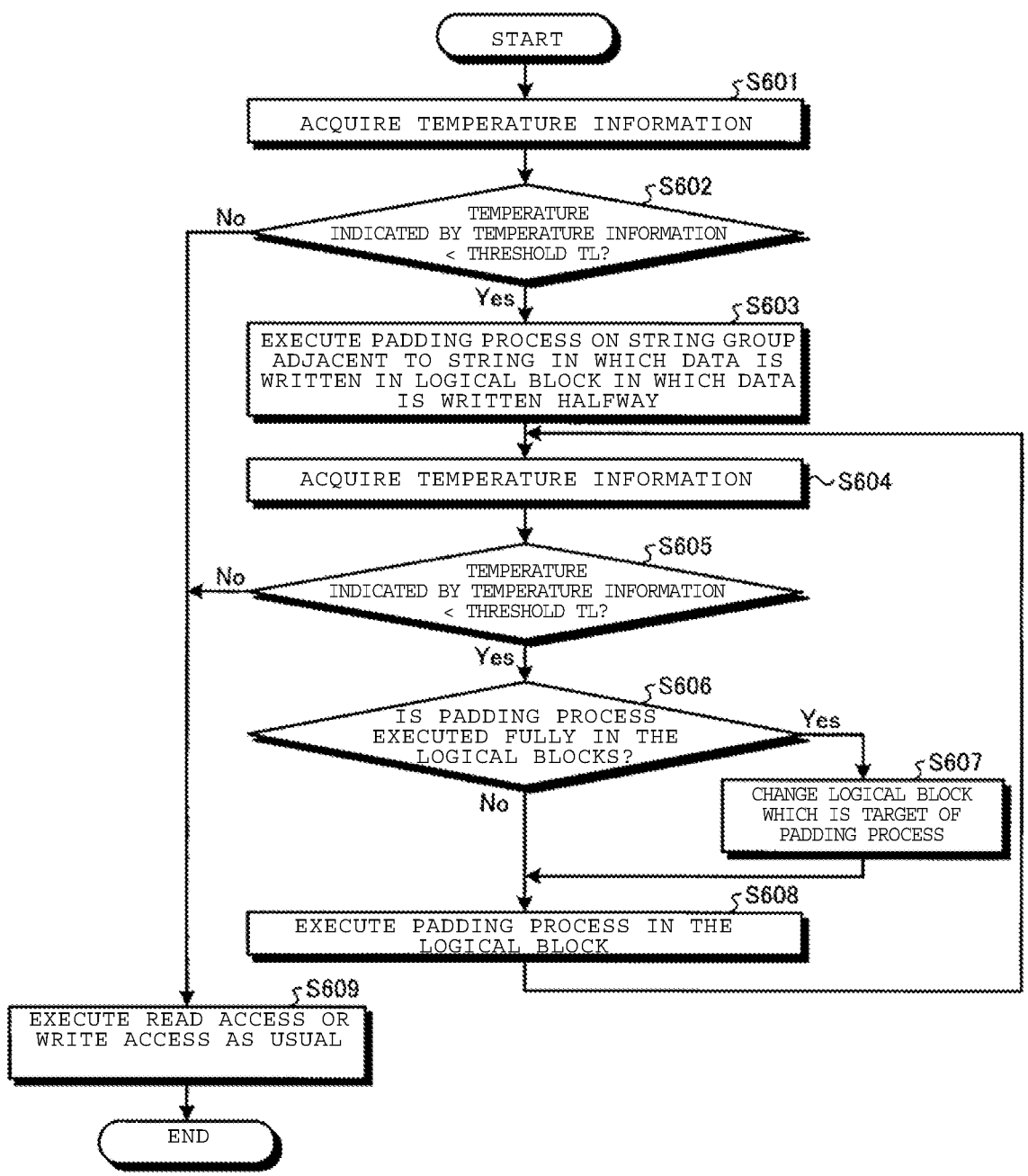
FIG. 6 is a flowchart illustrating a procedure of a padding process in a memory controller according to the first embodiment.

Next, the padding process in the memory controller 100 according to the embodiment will be described. FIG. 6 is a flowchart illustrating a procedure of the above-described process in the memory controller 100 according to the embodiment. In the flowchart of FIG. 6, for example, the padding process is executed before read access or write access from or on the NAND dies 130, 131, . . . , and 137 is executed in response to a request from the host apparatus HA.

First, the temperature acquisition unit 202 acquires the temperature information from the NAND dies 130, 131, . . . , and 137 (S601). In the embodiment, a control target is not limited to any particular NAND die or dies. For example, control may be executed for each of the NAND dies 130, 131, . . . , and 137 based on the temperature information acquired from the NAND dies 130, 131, . . . , and 137; or all of the NAND dies 130, 131, . . . , and 137 may be controlled based on the temperature information acquired from any one of the NAND dies 130, 131, . . . , and 137.

Subsequently, the determination unit 203 determines whether the temperature indicated by the temperature information is lower than the low-temperature threshold TL (S602). When the determination unit 203 determines that the temperature indicated by the temperature information is equal to or greater than the low-temperature threshold TL (No in S602), the access control unit 204 executes read access or write access on the NAND dies 130, 131, . . . , and 137 (S609) as usual and ends the process.

Conversely, when the determination unit 203 determines that the temperature indicated by the temperature information is lower than the low-temperature threshold TL (Yes in S602), the access control unit 204 executes the padding process, among the strings in which data is not written in the logical block in which the data is written halfway, on the string group 502 (which is equivalent to 4 strings) adjacent to the string group 501 in which data is written (S603).

Thereafter, the temperature acquisition unit 202 acquires the temperature information from the NAND dies 130, 131, . . . , and 137 again (S604).

Then, the determination unit 203 determines whether the temperature indicated by the temperature information is lower than the low-temperature threshold TL (S605). When the determination unit 203 determines that the temperature indicated by the temperature information is equal to or greater than the low-temperature threshold TL (No in S605), the access control unit 204 executes the read access or the write access on the NAND dies 130, 131, . . . , and 137 as usual (S609) and ends the process.

Conversely, when the determination unit 203 determines that the temperature indicated by the temperature information is still lower than the low-temperature threshold TL (Yes in S605), the access control unit 204 determines whether the padding process is executed fully in logical block which is a target of the padding process (S606). When the access control unit 204 determines that the padding process is executed fully in the logical block (Yes in S606), the access control unit 204 changes the target of the padding process to a subsequent logical block (S607).

Then, when the access control unit 204 does not execute the padding process on all the logical blocks (No in S606) and after the target of the padding process is changed in S607, the access control unit 204 executes the padding process for each string on the logical block which is the target of the padding process (S608). Thereafter, the process is executed from S604.

In the embodiment, as described above, for example, the padding process is executed in the NAND dies 130, 131, . . . , and 137 of which the temperature is desired to rise toward the room temperature. However, when the temperature of one NAND die rises in the same NAND package, the nearby NAND dies is also warmed. In this way, the padding process may be executed on any one of the NAND dies in the NAND package.

In the embodiment, by executing the padding process on the NAND dies 130, 131, . . . , and 137, it is possible to heat the NAND dies 130, . . . , and 137 to about the room temperature.

In the related art, when the NAND die is in a low-temperature state, a threshold voltage distribution of a cell is easily shifted. In other words, reading of data written in a low-temperature becomes more difficult. Then, if error bits are detected at the time of reading data because of reading of data becoming more difficult, retry reading should be executed. When the retry reading indicates that the reading of data becomes difficult, data of a page in which the reading of data becomes difficult is written to another page. i.e., refreshing should be performed on the page. The refreshing is a process of rewriting the data before an error in the data may become uncorrectable.

To the contrary, in the embodiment, by heating the NAND dies 130, . . . , and 137 to about the room temperature to prevent the reading of data from becoming more difficult, it is possible to prevent deterioration in the performance of the memory system 1 (e.g., a reduction in a read or write speed) due to an increase in a background process such as refreshing to be executed due to environmental temperature.

Modification Example 1 of First Embodiment

In the first embodiment, as described, for example, the access control unit 204 preferentially executes the padding process on the logical block including the physical blocks in which data is written halfway. However, the first embodiment is not limited to such control. In Modification Example 1 of the first embodiment, a case in which another method is executed will be described.

According to Modification Example 1 of the first embodiment, when the determination unit 203 determines that the temperature indicated by the temperature information acquired by the temperature acquisition unit 202 is lower than the low-temperature threshold TL, the access control unit 204 executes control such that current flows in the NAND dies 130, 131, . . . , and 137 provided in the NAND packages 120, 121, . . . , and 127. As the control for allowing the current to flow, any method may be used irrespective of a method used in the related art. In the modification example, by allowing the current to flow in the NAND dies 130, 131, . . . , and 137, it is possible to raise the temperature of the NAND dies 130, 131, . . . , and 137 toward the room temperature.

Modification Example 2 of First Embodiment

Another modification example will be described. In Modification Example 2 of the first embodiment, for example, the access control unit 204 of the CPU 101 in the memory controller 100 repeats a predetermined process.

According to Modification Example 2 of the first embodiment, when the determination unit 203 determines that the temperature indicated by the temperature information acquired by the temperature acquisition unit 202 is lower than the low-temperature threshold TL, the access control unit 204 executes a loop process using, for example, a "while" loop. Thus, it is possible to raise the temperature of the NAND dies 130, 131, . . . , and 137 in the memory system 1 up to the room temperature. In the modification example, as described above, the CPU 101 repeats the predetermined process for example. Any calculation circuit in the memory controller 100 may be used.

Modification Example 3 of First Embodiment

Another modification example will be described. In Modification Example 3 of the first embodiment, for example, the access control unit 204 executes garbage collection (hereinafter also referred to as compaction) and refreshing. The compaction is a process of transmitting (writing) valid data stored in a page of a block to another block and erasing the block from which the valid data has been transmitted when some data stored in pages in the block become invalid.

According to Modification Example 3 of the first embodiment, when the determination unit 203 determines that the temperature indicated by the temperature information acquired by the temperature acquisition unit 202 is lower than the low-temperature threshold TL, the access control unit 204 executes the compaction and the refreshing after a write access (data write) of a predetermined amount of data is executed in response to a request from the host apparatus HA. That is, the host apparatus HA may not recognize a slight delay in the compaction and the refreshing, which are background processes. Accordingly, in the modification example, after the temperature of the NAND dies 130, 131, . . . , and 137 is raised by executing the write access of the predetermined amount of data in response to the request from the host apparatus HA, the compaction and the refreshing are executed. The embodiment is not limited to the method of executing the compaction and the refreshing, but only one of the compaction or the refreshing may be executed.

Modification Example 4 of First Embodiment

Another modification example will be described. In Modification Example 4 of the first embodiment, for example, the access control unit 204 simultaneously writes a plurality of word lines.

According to Modification Example 4 of the first embodiment, when the determination unit 203 determines that the temperature indicated by the temperature information acquired by the temperature acquisition unit 202 is lower than the low-temperature threshold TL, the access control unit 204 executes control such that when a write access (data write) is executed in response to a request from the host apparatus HA, data to be written is temporarily stored in a cache (not illustrated) to accumulate a predetermined amount of data, and subsequently the data is simultaneously written in a plurality of word lines. The access control unit 204 may execute parallel writing over a plurality of channels or execute parallel writing on the plurality of dies as the control of the simultaneous writing.

In this way, in the modification example, it is possible to raise the temperature of the NAND dies 130, 131, . . . , and 137 toward the room temperature by heat generated in the simultaneous writing.

Modification Example 5 of First Embodiment

Another modification example will be described. According to Modification Example 5 of the first embodiment, when the determination unit 203 determines that the temperature indicated by the temperature information acquired by the temperature acquisition unit 202 is lower than the low-temperature threshold TL, the access control unit 204 executes data write into the NAND dies 130, 131, . . . , and 137 in an SLC mode and subsequently executes data write into the NAND dies 130, 131, . . . , and 137 in a TLC mode in which the number of bits recorded in a cell is greater than in the SLC mode. In the embodiment, after warming the NAND dies 130, 131, . . . , and 137 through the data write in the SLC mode, in which a data error rate is relatively low, to raise the temperature of the NAND dies 130, 131, . . . , and 137 toward the room temperature, the access control unit 204 subsequently executes the data write in the TLC mode.

In the modification example, by executing the data write in the SLC mode in which the number of bits recorded in a cell is less than in the TLC mode and the data error rate is relatively low before executing the data write in the TLC mode in which the data error rate is relatively high, the temperature of the NAND dies 130, 131, . . . , and 137 is raised. Thus, in the modification example, it is possible to reduce the data error rate and improve reliability.

In the modification example, the data write in the TLC mode has been described as an example. However, any recording mode (for example, an MLC mode or a QLC mode) may be used as long as the number of bits recorded in a cell in the recording mode is greater than that in a recording mode used in the first data write (for example, the SLC mode).

Modification Example 6 of First Embodiment

Another modification example will be described. In Modification Example 6 of the first embodiment, the access control unit 204 of the CPU 101 executes data write alternately on word lines in one block of the NAND dies 130, 131, . . . , and 137.

According to Modification Example 6 of the first embodiment, when the determination unit 203 determines that the temperature indicated by the temperature information acquired by the temperature acquisition unit 202 is lower than the low-temperature threshold TL, the access control unit 204 executes data write on one word line among the plurality of word lines of a write target block among the blocks provided in the NAND dies 130, 131, . . . , and 137, and subsequently executes data write on the other word line. Thereafter, the access control unit 204 executes data write on one the word line and subsequently executes data write on the other word line. In this way, by alternately executing the data write on the word lines, it is possible to heat the NAND dies 130, 131, . . . , and 137 and raise the temperature of the NAND dies 130, 131, . . . , and 137 toward the room temperature.

Second Embodiment

In the first embodiment, as described above, the padding process is executed to raise the temperature of the NAND dies 130, 131, . . . , and 137 toward the room temperature when the temperature of the NAND dies 130, 131, . . . , and 137 is lower than the low-temperature threshold TL. In embodiments, however, the process of raising the temperature toward the room temperature is not limited to software control such as the padding process, but a process of raising the temperature using hardware resources may be executed. Accordingly, in a second embodiment, a case in which the temperature is raised using a laser diode will be described.

In the NAND packages 120, 121, . . . , and 127 according to the embodiment, a thermal conductor sheet and a laser diode are installed in the packages.

Figure 7:
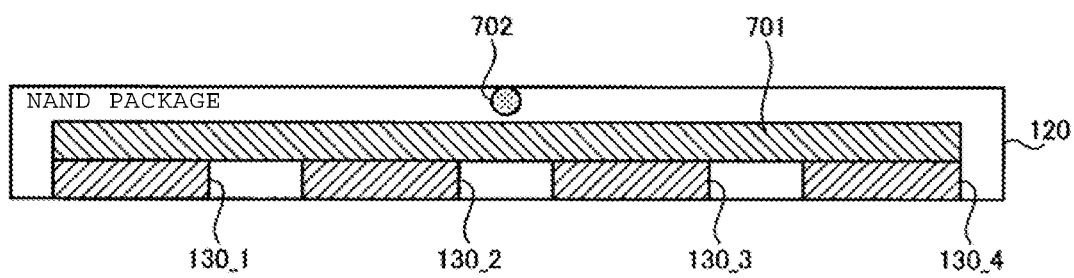
FIG. 7 is a diagram illustrating a cross section of a NAND package according to a second embodiment.

FIG. 7 is a diagram illustrating a cross section of a NAND package 120 according to the embodiment. As illustrated in FIG. 7, a thermal conductor sheet 701 is installed to intersect the NAND dies 130_1, . . . , and 130_4 provided in the NAND package 120. A laser diode 702 is installed on a surface facing the thermal conductor sheet 701 on the internal surface of the NAND package 120.

The memory controller 100 allows the laser diode 702 to emit light. Then, heat is transmitted to the NAND dies 130_1, . . . , and 130_4 via the thermal conductor sheet 701. Thus, the temperature of the NAND dies 130_1, . . . , and 130_4 can be raised toward the room temperature.

Figure 8:
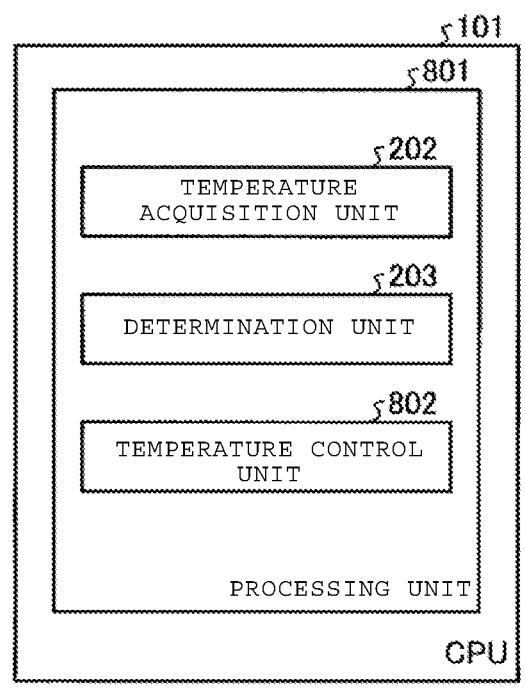
FIG. 8 is a block diagram illustrating a function realized by a CPU according to the second embodiment.

FIG. 8 is a block diagram illustrating a function realized by executing the firmware by the CPU 101 according to the embodiment. The CPU 101 functions as a processing unit 801 that controls the memory controller 100. The processing unit 801 includes the temperature acquisition unit 202, the determination unit 203, and a temperature control unit 802. The same reference numerals are given to the same configurations as those of the first embodiment and the description thereof will be omitted.

When the determination unit 203 determines that the temperature indicated by the temperature information acquired by the temperature acquisition unit 202 is lower than the low-temperature threshold TL, the temperature control unit 802 according to the embodiment executes control to allow the laser diode 702 to emit light. Thus, it is possible to raise the temperature of the NAND dies 130, . . . , and 137 toward the room temperature.

In the embodiment, when the laser diode 702 to emit laser light, it is possible to heat the NAND dies 130, . . . , and 137 to about the room temperature. In the embodiment, by heating the temperature of the NAND dies 130, . . . , and 137 to about the room temperature to prevent the reading of data from becoming more difficult, it is possible to prevent deterioration in the performance of the memory system 1 (a reduction in a read or write speed) due to an increase in a background process such as refreshing to be executed due to environmental temperature.

Modification Example 1 of Second Embodiment

In the second embodiment, as described above, for example, one laser diode 702 warms the plurality of NAND dies 1301, . . . , and 130_4 using the thermal conductor sheet 701. However, the second embodiment is not limited to the method to use the thermal conductor sheet 701. Accordingly, in Modification Example 1 of the second embodiment, a laser diode provided for each of the NAND dies 130_1, . . . , and 130_4 will be described.

Figure 9:
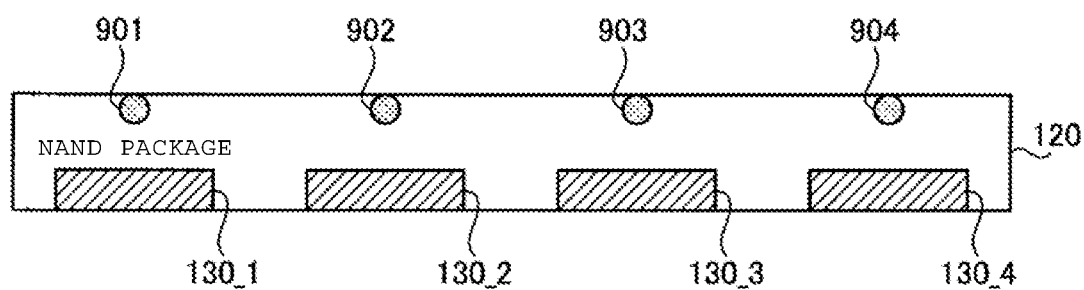
FIG. 9 is a diagram illustrating a cross section of a NAND package according to Modification Example 1 of the second embodiment.

FIG. 9 is a diagram illustrating a cross section of a NAND package 120 according to the modification example. As illustrated in FIG. 9, laser diodes 901, 902, 903, and 904 are installed in the NAND dies 130_1, . . . , and 130_4 installed in the NAND package 120.

As in the second embodiment, when the determination unit 203 determines that the temperature indicated by the temperature information acquired by the temperature acquisition unit 202 is lower than the low-temperature threshold TL, the temperature control unit 802 executes control such that the laser diodes 901, 902, 903, and 904 emit light. Thus, it is possible to raise the temperature of the NAND dies 130, . . . , and 137 toward the room temperature.

Modification Example 2 of Second Embodiment

In the second embodiment and the modification example, the method of installing the laser diodes in the NAND package has been described. However, the positions at which the laser diodes are installed are not limited. Accordingly, in Modification Example 2 of the second embodiment, a method of installing a laser diode in a casing that covers the entire memory system 1 will be described. The configuration of the memory system is the same as that of the above-described embodiment, and thus the description thereof will be omitted.

Figure 10:
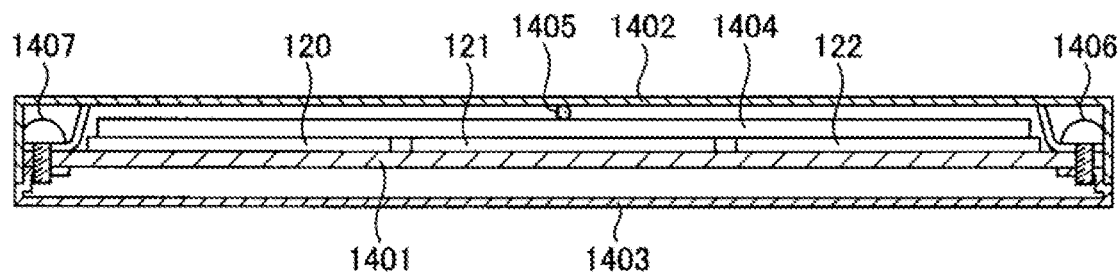
FIG. 10 is a diagram illustrating a cross section of a memory system according to Modification Example 2 of the second embodiment.

FIG. 10 is a diagram illustrating a cross section of a memory system according to the modification example. In an example illustrated in FIG. 10, a first cover 1402 and a second cover 1403 are installed as the casing that covers the memory system 1. The first cover 1402, the second cover 1403, and a circuit plate 1401 are fixed by screws 1406 and 1407, for example.

The NAND packages 120, 121, 122, and the like are installed on the circuit plate 1401. A thermal conductor sheet 1404 is installed to cover the upper surfaces of the NAND packages 120, 121, 122, and the like. A laser diode 1405 is installed on a surface of the first cover 1402, which is a part of the casing of the memory system 1, facing the thermal conductor sheet 1404.

Heat is transmitted to the NAND packages 120, 121, 122, and the like via the thermal conductor sheet 1404 when the laser diode 1405 emits light based on a control of the memory controller 100. Thus, the temperature of the NAND packages 120, 121, 122, and the like can be raised toward the room temperature. A control method for allowing the laser diode 1405 to emit light is the same as that of the second embodiment, and thus the description thereof will be omitted. In this way, it is possible to obtain the same advantages as those of the second embodiment.

Modification Example 3 of Second Embodiment

In Modification Example 2 of the second embodiment, as described above, for example, one laser diode 1405 warms the plurality of NAND packages 120, 121, 122, and the like using the thermal conductor sheet 1404. However, Modification Example 2 of the second embodiment is not limited to the method to use the thermal conductor sheet 1404. Accordingly, in Modification Example 3 of the second embodiment, a laser diode installed for each of the NAND packages 120, 121, 122, and the like will be described.

Figure 11:
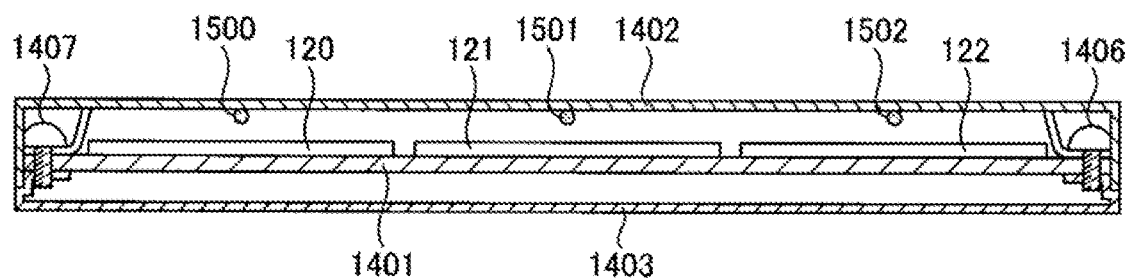
FIG. 11 is a diagram illustrating a cross section of a memory system according to Modification Example 3 of the second embodiment.

FIG. 11 is a diagram illustrating a cross section of a memory system according to the modification example. In an example illustrated in FIG. 11, the same reference numerals are given to the same configurations as those in FIG. 10, and thus the description thereof will be omitted. As illustrated in FIG. 11, laser diodes 1500, 1501, 1502, and the like are respectively installed for the NAND packages 120, 121, 122, and the like installed in the memory system.

The temperature of the NAND packages 120, 121, 122, and the like can be raised toward the room temperature when the laser diodes 1500, 1501, 1502, and the like emit light based on the control of the memory controller 100. A control method for allowing the laser diodes 1500, 1501, 1502, and the like to emit light is as the same as that of the second embodiment, and thus the description thereof will be omitted. In this way, it is possible to obtain the same advantages as those of the second embodiment.

Third Embodiment

In the second embodiment, as described above, for example, the temperature of the NAND dies 130, . . . , and 137 is raised toward the room temperature using the laser diode as a heat source. However, the heat source (hardware resources) that raises the temperature of the NAND dies 130, . . . , and 137 toward the room temperature is not limited to the laser diode. Accordingly, in a third embodiment, the NAND dies 130, . . . , and 137 warmed by allowing a current to flow in a conductive wire will be described.

Figure 12:
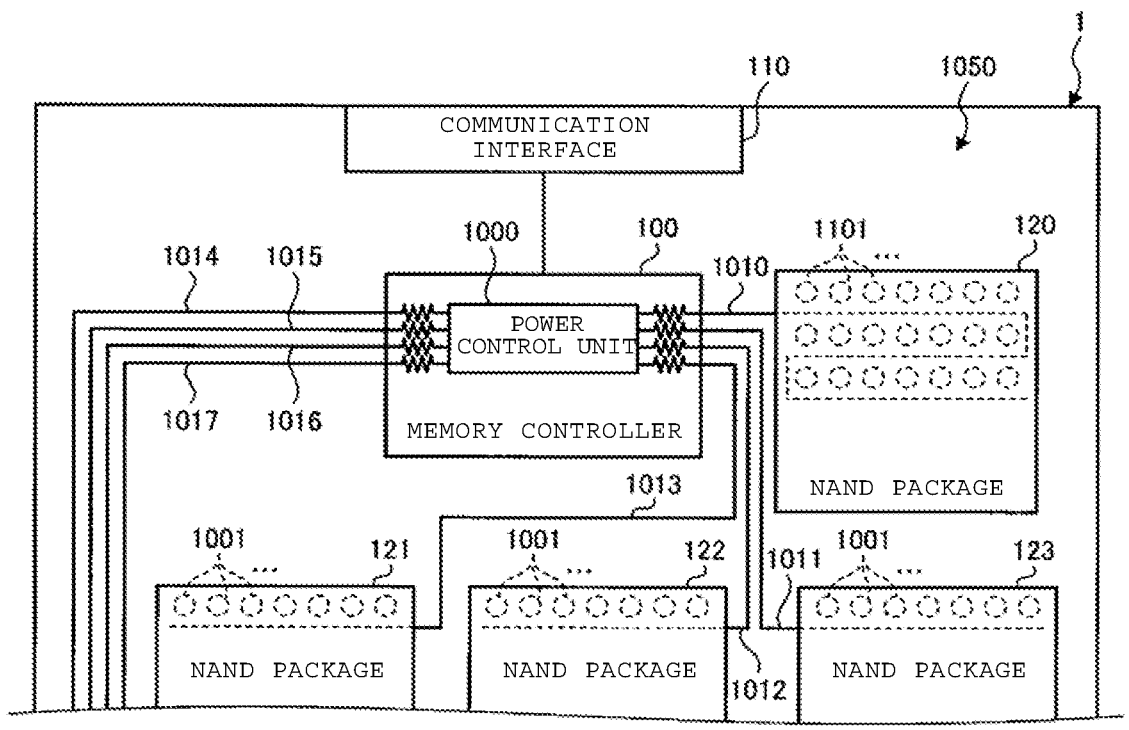
FIG. 12 is a diagram illustrating a conductive wire pattern wired in a memory system according to a third embodiment.

FIG. 12 is a diagram illustrating a conductive wire pattern wired in the memory system 1 according to a third embodiment. As illustrated in FIG. 12, the memory controller 100 includes a power control unit 1000. Conductive wires 1010, 1011, 1012, and the like are wired from the power control unit 1000 to the NAND packages 120, 121, 122, and the like via resistors, respectively.

The memory controller 100 can execute control such that a current selectively flows to the conductive wires 1010, 1011, 1012, and the like. Thus, for example, the memory controller 100 can execute control such that a current flows only in a NAND package of which temperature is determined to be low or a NAND package which is an access target among the NAND packages 120, 121, 122, and the like.

Figure 13:
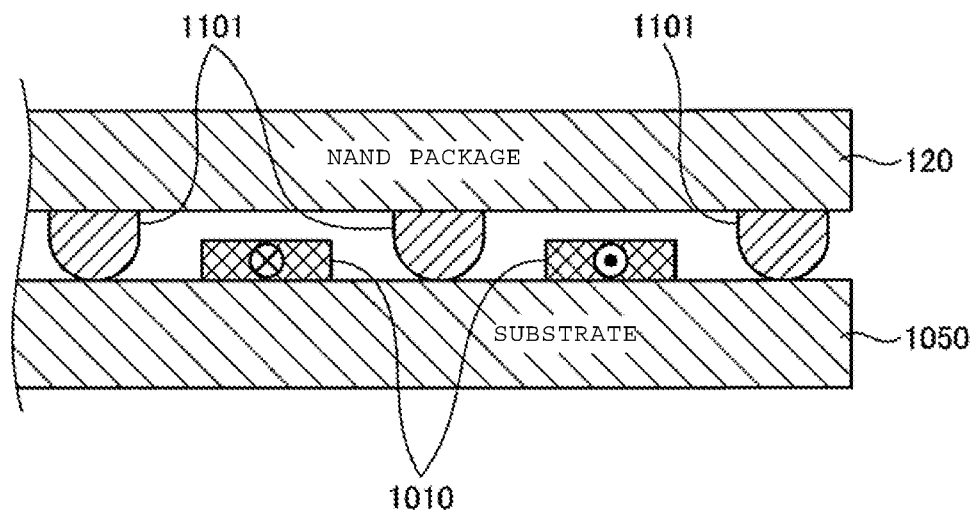
FIG. 13 is a diagram illustrating a partial cross section of a NAND package and a substrate according to the third embodiment.

FIG. 13 is a diagram illustrating a partial cross section of the NAND package 120 and a substrate 1050 according to the third embodiment. As illustrated in FIG. 13, the conductive wire 1010 is wired on the substrate 1050 and between solder balls 1101 of the NAND package 120. Thus, by allowing a current to flow in the conductive wire 1010 in which a resistor is installed, it is possible to raise the temperature of the NAND package 120.

As in the conductive wire 1010 illustrated in FIG. 13, the other conductive wires 1011, 1012, and the like are wired between the other NAND packages 121, 122, and the like and the substrate 1050. Specifically, the other conductive wires 1011, 1012, and the like are wired between solder balls that connect the other NAND packages 121, 122, and the like with the substrate 1050.

The control may be executed by any functional block. For example, the temperature control unit 802 according to the second embodiment may execute the control. That is, when the determination unit 203 determines that the temperature indicated by the temperature information acquired by the temperature acquisition unit 202 is lower than the low-temperature threshold TL, the temperature control unit 802 executes control to flow a current in the conductive wires 1010, 1011, 1012, and the like via the power control unit 1000. Thus, it is possible to obtain the same advantages as those of the second embodiment.

In the embodiment, conductive wires disposed near the NAND packages 120, 121, 122, and the like are allowed to generate heat through a current flowing therein. Thus, it is possible to heat the NAND packages 120, 121, 122, and the like to about the room temperature. In the embodiment, by heating the NAND packages 120, 121, 122, and the like to about the room temperature to prevent the reading of data from becoming more difficult, it is possible to prevent deterioration in the performance of the memory system 1 (a reduction in a read or write speed) due to an increase in a background process such as refreshing to be executed due to environmental temperature.

The NAND packages 120, 121, 122, and the like are warmed by heating the conductive wires in the example given. However, the NAND packages 120, 121, 122, and the like may all be simultaneously warmed, or only the package in which read or write control is executed may be warmed.

In the embodiment, as described above, for example, the conductive wires are respectively installed in the NAND packages 120, 121, 122, and the like, but a wiring pattern of the conductive wires is not limited. For example, one conductive wire may be wired to pass through all the NAND packages 120, 121, 122, and the like. Further, in the embodiment, the method of wiring the conductive wires is not limited. For example, the conductive wires may be wired inside a substrate (e.g., the uppermost layer of a stacked substrate).

In the embodiments, as described above, the heating control is executed using the conductive wires or the laser diodes on the NAND packages 120, 121, 122, and the like, or on the NAND dies 130, 131, . . . , and 137 in the NAND packages 120, 121, 122, and the like. However, embodiments do not limit the heat source that performs the heating control. The heating control may be able to be executed by a heat source installed near the NAND packages 120, 121, 122, and the like, or installed near the NAND dies 130, 131, . . . , and 137 in the NAND packages 120, 121, 122, and the like.

Fourth Embodiment

In the embodiments and modification examples, as described above, for example, a case where the temperature of the NAND dies 130, 131, . . . , and 137 is lower than the room temperature has been considered. However, embodiments and modification examples are not limited to a process executed when the temperature of the NAND dies 130, 131, . . . , and 137 is lower than the room temperature. When the temperature of the NAND dies 130, 131, . . . , and 137 is higher than the room temperature, a process may also be executed to adjust the temperature. Accordingly, in a fourth embodiment, a process executed when the temperature of the NAND dies 130, 131, . . . , and 137 is higher than the room temperature will be described.

Figure 14:
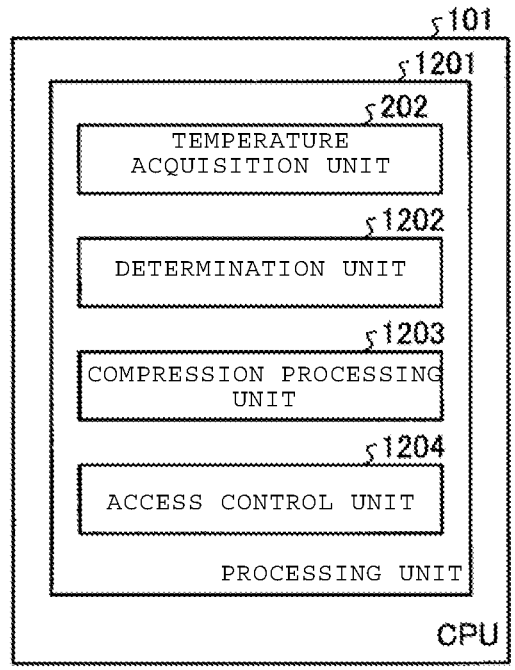
FIG. 14 is a block diagram illustrating a function realized by a CPU according to a fourth embodiment.

FIG. 14 is a block diagram illustrating a function realized by executing the firmware by the CPU 101 according to the embodiment. The CPU 101 functions as a processing unit 1201 that controls the memory controller 100. The processing unit 1201 includes the temperature acquisition unit 202, the determination unit 1202, a compression processing unit 1203, and an access control unit 1204.

The determination unit 1202 determines whether the temperature indicated by the temperature information acquired by the temperature acquisition unit 202 is higher than a high-temperature threshold TH. The high-temperature threshold TH is a threshold for determining whether the temperature is high. The high-temperature threshold TH is defined according to an embodiment such as the specification or the like of the NAND packages 120, 121, . . . , and 127.

When the determination unit 1202 determines that the temperature indicated by the temperature information acquired by the temperature acquisition unit 202 is higher than the high-temperature threshold TH, the compression processing unit 1203 executes a compression process on data which is received from the host apparatus HA and is to be written into the NAND memory (hereinafter referred to as write data). In the embodiment, an amount of data to be written in the NAND dies 130, . . . , and 137 is reduced when the compression processing unit 1203 compresses the write data. Thus, since energy consumed when writing the data in the NAND dies 130, . . . , and 137 is reduced, it is possible to prevent a rise in temperature.

The access control unit 1204 executes access control on the NAND packages 120, 121, . . . , and 127 based on a determination result by the determination unit 1202. In the embodiment, when the determination unit 1202 determines that the temperature indicated by the temperature information acquired by the temperature acquisition unit 202 is higher than the high-temperature threshold TH, the access control unit 1204 executes a process of writing the write data compressed by the compression processing unit 1203 on the NAND dies 130, . . . , and 137 in, for example, a multiple level cell (MLC) mode of storing 2-bit information per cell. Then, when the determination unit 1202 determines that the temperature indicated by the temperature information is higher than the high-temperature threshold TH, the access control unit 1204 executes a process of writing uncompressed write data in the NAND dies 130, . . . , and 137 in a triple level cell (TLC) mode in which the number of bits recorded on a cell is greater than in the MLC mode.

In this way, when the temperature of the NAND dies 130, . . . , and 137 is determined to be the room temperature, the access control unit 1204 according to the embodiment writes uncompressed write data in TLC mode. When the temperature of the NAND dies 130, . . . , and 137 is determined to be high temperature, the access control unit 1204 writes the compressed write data in the MLC mode. Since an amount of written data is greater in the TLC mode than in the MLC mode, an amount of electrons provided to the NAND dies 130, . . . , and 137 increases. In other words, by switching the recording mode from the TLC mode to the MLC mode, it is possible to reduce an amount of electrons provided to the NAND dies 130, . . . , and 137. Thus, it is possible to reduce a total energy amount used for the writing.

In the embodiment, as described above, for example, the TLC mode of storing 3-bit information per cell is switched to the MLC mode of storing 2-bit information per cell as the recording mode. However, in the embodiment, switching of the recording mode is not limited, as long as the number of bits stored per cell can be switched. For example, the recording mode may be switched between a quad level cell (QLC) mode of storing 4-bit information per cell and a single level cell (SLC) mode of storing 1-bit information per cell, may be switched between the TLC mode and the SLC mode, or may be switched between the MLC mode and the SLC mode.

That is, in the embodiment, when the determination unit 1202 determines that the temperature indicated by the temperature information acquired by the temperature acquisition unit 202 is higher than the high-temperature threshold TH, it is possible to lower temperature by compressing the write data and subsequently reducing the number of bits stored per cell to reduce heat being in the NAND dies 130, . . . , and 137.

Figure 15:
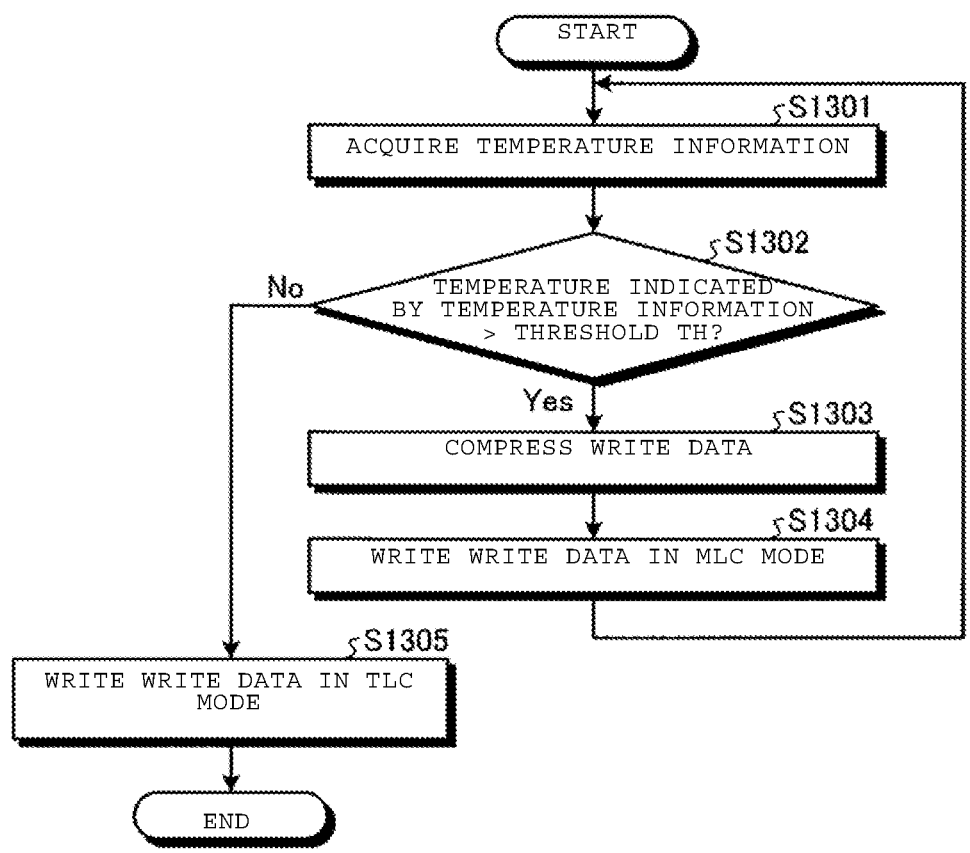
FIG. 15 is a flowchart illustrating a procedure of a compression process of write data in a memory controller according to the fourth embodiment.

Next, a process of compressing write data in the memory controller 100 according to the embodiment will be described. FIG. 15 is a flowchart illustrating a procedure of the above-described process in the memory controller 100 according to the embodiment.

The temperature acquisition unit 202 first acquires the temperature information from the NAND dies 130, 131, . . . , and 137 (S1301).

Subsequently, the determination unit 1202 determines whether the temperature indicated by the temperature information is higher than the high-temperature threshold TH (S1302). When the determination unit 1202 determines that the temperature indicated by the temperature information is equal to or lower than the high-temperature threshold TH (No in S1302), the access control unit 1204 writes the write data in the NAND dies 130, 131, . . . , and 137 in the TLC mode (S1305) and ends the process.

Conversely, when the determination unit 1202 determines that the temperature indicated by the temperature information is higher than the high-temperature threshold TH (Yes in S1302), the compression processing unit 1203 compresses the write data (S1303). Then, the access control unit 1204 writes the compressed write data in the MLC mode (S1304). Thereafter, the process is executed from S1301 again.

In the embodiment, with the above-described configuration, it is possible to prevent heating of the NAND dies 130, 131, . . . , and 137 and lower the temperature. Therefore, it is possible to prevent the performance from deteriorating due to the temperature at the time of writing.

In the embodiment, as described above, the process is executed to lower the temperature toward the room temperature when the temperature of the NAND dies 130, 131, . . . , and 137 is greater than the high-temperature threshold TH. The embodiment is not limited to only the above-described process. For example, the process of actively raising the temperature of the NAND dies 130, 131, . . . , and 137 toward the room temperature when the temperature is lower than the low-temperature threshold TL in the first embodiment and the modification examples of the first embodiment and the process of warming the NAND dies 130, 131, . . . , and 137 using the hardware resources described in the second and third embodiments may be combined.

In the embodiment, heat generated in the NAND dies 130, 131, . . . , and 137 is reduced by reducing the amount of data to be written in the NAND dies 130, 131, . . . , and 137. Thus, the NAND dies 130, 131, . . . , and 137 is prevented from being exposed to a high-temperature state.

That is, when the NAND dies are in a high-temperature state, a threshold voltage distribution of the cell is tend to shift as in the low-temperature state. In other words, reading of data written in a high-temperature state becomes more difficult.

In the embodiment, by lowering the temperature of the NAND dies 130, . . . , and 137 to prevent the reading of data from becoming difficult, it is possible to prevent deterioration in the performance of the memory system 1 (a reduction in a read or write speed) due to an increase in a background process such as refreshing to be executed due to environmental temperature.

Modification Example 1 of Fourth Embodiment

In the fourth embodiment, as described above, for example, the access control unit 1204 compresses the data and switches the recording mode from the TLC mode to the MLC mode. However, the fourth embodiment is not limited to such control. In Modification Example 1 of the fourth embodiment, another scheme to be executed will be described.

According to Modification Example 1 of the fourth embodiment, the access control unit 1204 inhibits compaction operation and refreshing operation on the NAND dies 130, . . . , and 137 until the temperature of the NAND dies 130, . . . , and 137 returns toward the room temperature and preferentially accesses the NAND dies 130, . . . , and 137 based on a request from the host apparatus HA.

According to Modification Example 1 of the fourth embodiment, when the determination unit 1202 determines that the temperature indicated by the temperature information acquired by the temperature acquisition unit 202 is higher than the high-temperature threshold TH, the access control unit 1204 inhibits the compaction operation and the refreshing operation on the NAND dies 130, 131, . . . , and 137. Since the compaction operation and the refreshing operation are inhibited, heat generated from the NAND dies 130, 131, . . . , and 137 is reduced. Therefore, it is possible to lower the temperature of the NAND dies 130, 131, . . . , and 137 toward the room temperature. In the modification example, as described above, for example, the compaction operation and the refreshing operation are inhibited. However, only one of the compaction operation or the refreshing operation may be inhibited.

Modification Example 2 of Fourth Embodiment

Another modification example will be described. According to Modification Example 2 of the fourth embodiment, when the determination unit 1202 determines that the temperature indicated by the temperature information acquired by the temperature acquisition unit 202 is higher than the high-temperature threshold TH, the access control unit 1204 executes control such that a waiting period is inserted into access to the NAND dies 130, 131, . . . , and 137.

According to the modification example, the access control unit 1204 executes the control such that the waiting period is inserted when reading, writing, and erasing are executed on the NAND dies 130, 131, . . . , and 137. By awaiting data reading, data writing, and data erasing, it is possible to prevent heat generation. As the waiting period inserted into reading, writing, and erasing, an appropriate waiting period is set according to an aspect of an embodiment. The waiting period inserted into reading, writing, and erasing may be different or identical.

Thus, an interval of access to the NAND dies 130, 131, . . . , and 137 may be lengthened. Thus, since heat generated from the NAND dies 130, 131, . . . , and 137 is reduced, it is possible to lower the temperature of the NAND dies 130, 131, . . . , and 137 toward the room temperature.

Modification Example 3 of Fourth Embodiment

Another modification example will be described. According to Modification Example 3 of the fourth embodiment, when the determination unit 1202 determines that the temperature indicated by the temperature information acquired by the temperature acquisition unit 202 is higher than the high-temperature threshold TH, the access control unit 1204 reduces the number of simultaneous accesses to the NAND dies 130, 131, . . . , and 137 (the number of times of writing, reading, or erasing) than when the temperature indicated by the temperature information is determined to be equal to or less than the high-temperature threshold TH.

The reduction in the number of accesses may refer to a reduction in the number of channels operated in parallel or a reduction in the number of dies operated in parallel (bank-interleaved) in one channel of the memory system 1. In the modification example, the operation executed in parallel is considered to be writing, reading, and erasing. One or more of these operations may be executed.

In other words, the number of channels or the number of dies operated in parallel is further reduced through control by the access control unit 1204 when the temperature indicated by the temperature information is determined to be higher than the high-temperature threshold TH than when the temperature indicated by the temperature information is determined to be equal to or less than the high-temperature threshold TH.

Thus, since the heat generated from the NAND dies 130, 131, . . . , and 137 is reduced, it is possible to lower the temperature of the NAND dies 130, 131, . . . , and 137 toward the room temperature.

In the embodiment and the modification examples, as described above, for example, the temperature of the NAND dies is adjusted up to the room temperature when the temperature of the NAND dies is low or high. However, the method of adjusting the temperature up to the room temperature is not limited, but the temperature may be adjusted toward temperature at which an error rate is low. For example, reading may be executed after the temperature is controlled toward a temperature (which may not be the room temperature) at which a data error rate is low in accordance with temperature at the time of writing, by the method used in the above-described embodiment and modification example.

In the embodiment and the modification examples, a case where the temperature of the nonvolatile memory is higher the high-temperature threshold TH or lower than the low-temperature threshold TL has been described. However, the embodiments and the modification examples are not limitedly applied to such a case, but can be applied to a case where the temperature of the nonvolatile memory satisfies a predetermined condition. For example, when a rising rate or a lowering rate of the temperature exceeds a predetermined threshold, control may be executed such that the temperature is adjusted.

In the embodiment and the modification examples, as described above, for example, the control is executed such that the temperature of the NAND dies 130, 131, . . . , and 137 is adjusted from the low-temperature state or the high-temperature state toward the room-temperature state. Incidentally, in a nonvolatile memory such as the NAND dies 130, 131, . . . , and 137, due to an influence of temperature characteristics, performance under a low-temperature or high-temperature environment degrades more easily than at the room temperature.

For example, in a nonvolatile memory at a high-temperature state, data retention characteristics deteriorate more than at the room temperature. On the other hand, a nonvolatile memory at a low-temperature state is tend to be affected by read disturb or program disturb more than at the room temperature.

Since the nonvolatile memory has the above-described characteristics, it is easier for the threshold voltage distribution of a cell of the nonvolatile memory to shift at high temperature or low temperature than the room temperature. That is, the reading of data becomes more difficult at high temperature or low temperature.

When the reading of data becomes more difficult, a background process to be executed such as refreshing increases. Therefore, a processing speed for a command received from the host apparatus HA is lowered. In other words, a read speed or a write speed is reduced.

However, in the embodiment and the modification examples, by executing the control for setting a low-temperature state or a high-temperature state toward the room-temperature state, it is possible to prevent an increase in a background process to be executed due to environmental temperature. Therefore, it is possible to prevent degradation of the performance (a reduction in a read or write speed) of the memory system 1. In the embodiment and the modification examples, it is possible to improve the easiness of reading of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a nonvolatile memory including a plurality of dies each including a plurality of blocks, each of the plurality of blocks being a unit for an erase operation and including a plurality of word lines and a plurality of string chunks crossing the word lines, a group of memory cells being connected between one of the word lines and one of the string chunks; and
    a memory controller connected to the dies via a plurality of channels and configured to execute a process to adjust a temperature of the nonvolatile memory upon determining by the memory controller that the temperature is outside a preferred range, wherein
    the memory controller is configured to, if the temperature is above the preferred range, adjust the temperature by decreasing a number of the channels or the dies accessed in parallel, and if the temperature is below the preferred range, adjust the temperature by executing a padding process during which data is written in one or more memory cells,
    the memory controller selects for the padding process a first group of memory cells at an intersection of a first string chunk and a first word line, and
    the first group of memory cells are in an erased state and is adjacent to:
        a second group of memory cells that are not in the erased state and are at an intersection of a second string chunk that is adjacent to the first string chunk and the first word line, and
        a third group of memory cells that are not in the erased state and are at an intersection of the first string chunk and a second word line that is adjacent to the first word line.

2. The memory system according to claim 1,
    wherein the block on which the padding process is executed is included in a logical block that is designated by an access request to the nonvolatile memory.

3. The memory system according to claim 2, wherein the memory controller is further configured to
    determine, after the padding process, whether or not the temperature of the nonvolatile memory is within the preferred range, and upon determining that the temperature is still outside the preferred range, execute the padding process on another block of the logical block.

4. The memory system according to claim 1,
    wherein the memory controller is configured to
    execute heating control to heat the nonvolatile memory as the process to adjust the temperature of the nonvolatile memory.

5. The memory system according to claim 4, wherein the memory controller is configured to
    execute the heating control by turning on a laser diode installed inside a package of the nonvolatile memory.

6. The memory system according to claim 4, further comprising:
    a circuit board on which the nonvolatile memory is mounted with solder balls,
    wherein the memory controller is configured to execute the heating control by allowing a current to flow in a conductive wire installed on a substrate of the circuit board and located between the solder balls.

7. The memory system according to claim 1, wherein the memory controller is configured to
    if the temperature is above the preferred range, compress data to be written to the nonvolatile memory and write the compressed data to the nonvolatile memory.

8. The memory system according to claim 1,
    wherein the memory controller is configured to select a different recording mode as the process to adjust the temperature of the nonvolatile memory when writing data to the nonvolatile memory.

9. The memory system according to claim 1, wherein the memory controller is configured to
    if the temperature is below the preferred range, execute control to allow a current to flow in the nonvolatile memory as the process to adjust the temperature of the nonvolatile memory before accessing the nonvolatile memory in response to a request received from a host.

10. The memory system according to claim 1, wherein the memory controller includes a calculation circuit and is configured to
    repeat a predetermined process using the calculation circuit as the process to adjust the temperature of the nonvolatile memory.

11. The memory system according to claim 1, wherein the memory controller includes a write buffer and is configured to
    accumulate write data in the write buffer, and
    perform parallel writing of the write data accumulated in the write buffer as the process to adjust the temperature of the nonvolatile memory.

12. The memory system according to claim 1, wherein the memory controller is configured to
    execute write control alternately on the word lines provided in one block of the nonvolatile memory as the process to adjust the temperature of the nonvolatile memory.

13. The memory system according to claim 1, wherein the memory controller is configured to
    insert a wait period into a process executed on the nonvolatile memory as the process to adjust the temperature of the nonvolatile memory.

14. The memory system according to claim 1, wherein the first group of memory cells is adjacent to a fourth group of memory cells that are in the erased state and are at an intersection of a third string chunk that is adjacent to the first string chunk and the first word line.

15. The memory system according to claim 14, wherein the first group of memory cells is adjacent to a fifth group of memory cells that are in the erased state and are at an intersection of the first string chunk and a third word line adjacent to the first word line.

* * * * *